United States Patent [19]
Hill

[11] 3,843,921
[45] Oct. 22, 1974

[54] BATTERY CHARGING SYSTEMS
[75] Inventor: William Frank Hill, Stafford, England
[73] Assignee: The Lucas Electrical Company Limited, Birmingham, England
[22] Filed: Aug. 24, 1973
[21] Appl. No.: 391,273

[30] Foreign Application Priority Data
Jan. 9, 1972 Great Britain.................... 40614/72

[52] U.S. Cl.......................... 322/28, 320/64, 322/69
[51] Int. Cl............................................. H02j 7/16
[58] Field of Search ............ 320/64, 68; 322/68, 69, 322/28, 7; 317/13 R, 16, 31

[56] References Cited
UNITED STATES PATENTS
2,992,383  7/1961  Hetzler et al. ......................... 322/28
3,353,066  11/1967  DeSouza ......................... 317/16 X Primary Examiner—J. D. Miller
Assistant Examiner—Robert J. Hickey
Attorney, Agent, or Firm—Holman & Stern

[57] ABSTRACT

A battery charging system for a road vehicle has a wound field alternator charging the battery and a voltage regulator controlling current flow in the field winding of the alternator. In order to protect against faults in the system, a first freewheel path is connected across the field winding to dissipate energy stored in the field winding in normal use. If the alternator output rises too much, this first freewheel path is disconnected, and is replaced by a second freewheel path of substantially greater dissipation, so that the energy in the field winding is dissipated rapidly.

20 Claims, 5 Drawing Figures

BATTERY CHARGING SYSTEMS

This invention relates to battery charging systems, particularly for road vehicles.

A battery charging system according to the invention comprises a wound field alternator for charging the battery, a voltage regulator for controlling the output of the alternator by varying the current flow in the field winding of the alternator, a first freewheel path connected across said field winding and permitting continued flow of current in said field winding when the supply to the field winding is interrupted, a second freewheel path across said field winding and having a substantially higher rate of dissipation than the first freewheel path, and means operable when the output voltage of the alternator exceeds a predetermined value in excess of the regulated value for disconnecting the first freewheel path whereby current flows through the second freewheel path.

The second freewheel path may be permanently connected across the field winding, but in this case it will normally be short-circuited by the first freewheel path. Alternatively, the second freewheel path can be connected across the field winding only when the first freewheel path is disconnected. Parts of the first and second freewheel paths may be common, and in particular the first and second freewheel paths may employ a common diode.

The advantage of the two freewheel paths will become apparent from the examples now to be described.

Figure 1:
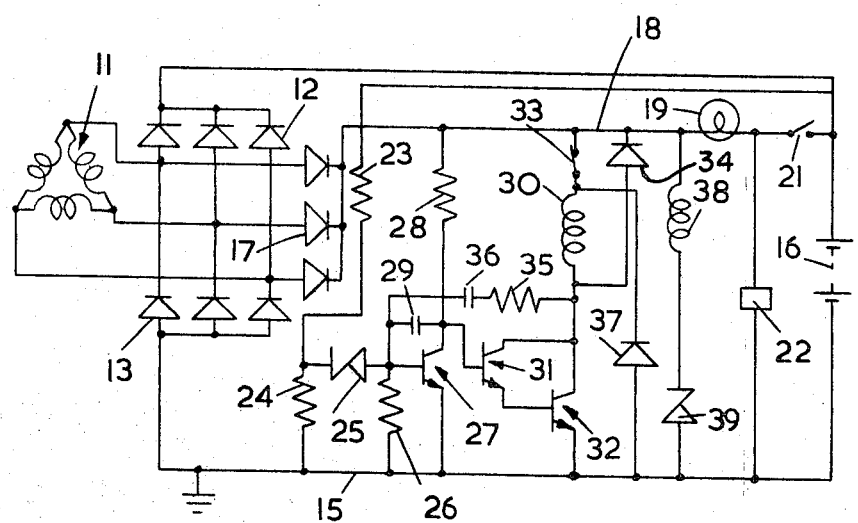

In the accompanying drawings,

FIG. 1 is a circuit diagram illustrating one example of the invention, and

FIGS. 2 to 5 respectively are circuit diagrams illustrating four modifications of the arrangement shown in FIG. 1.

Referring to FIG. 1, a battery charging system for use in a road vehicle includes vehicle, three phase wound field alternator having a delta connected stator 11 providing an output by way of diodes 12 and 13 respectively to positive and negative supply lines 14, 15 between which the battery 16 of the vehicle is connected. The phase points of the stator are connected through three additional diodes 17 to a further positive supply line 18, and the line 18 is connected to the positive terminal of the battery 16 through an ignition warning lamp 19 and the ignition switch 21 of the vehicle in series. The ignition switch 21 is connected across the battery 16 in series with the ignition loads 22 of the vehicle. and the line 15 is earthed.

The system further includes a voltage regulator incorporating a pair of resistors 23, 24 connected in series between the positive terminal of the battery 16 and the line 15. The junction of the resistors 23, 24 is connected to the line 15 through a Zener diode 25 in series with a resistor 26, and the junction of the Zener diode 25 and resistor 26 is connected to the base of an n-p-n transistor 27 having its emitter connected to the line 15 and its collector connected to the line 18 through a resistor 28. The collector and base of the transistor 27 are bridged by a capacitor 29 for minimising radio interference, and the collector of the transistor 27 is further connected to the base of an n-p-n transistor 31 having its emitter connected to the base of an n-p-n transistor 32 with its emitter connected to the line 15. The collectors of the transistors 31 and 32 are interconnected, and are connected to the line 18 through the field winding 30 of the alternator and a normally closed relay contact 33 in series. The series connection of winding 30 and contact 33 is bridged by a freewheel diode 34, and the collectors of the transistors 31 and 32 are further connected to the base of the transistor 27 through a positive feedback circuit including a resistor 35 and a capacitor 36 in series. The junction of the winding 30 and contact 33 is connected to the line 15 through a diode 37, and the lines 18, 15 are bridged by a series circuit including a relay winding 38 and a Zener diode 39, the winding 38 serving when it is energised to open the contact 33. In operation, a small current flows permanently through the resistors 23 and 24, but this current is negligible. When the ignition switch 21 is closed, current can flow to the ignition loads 22, and current also flows through the lamp 19, the resistor 28, and the base emitter circuits of the transistors 31 and 32 to turn on the transistors 31 and 32 and energise the winding 30. At this stage the lamp 19 is of course illuminated. As soon as the alternator produces an output, the potential of the line 18 becomes approximately equal to the positive battery potential, and so the lamp 19 is extinguished. When the battery voltage exceeds a predetermined value, the Zener diode 25 conducts, turning on the transistor 27 and removing base current from the transistors 31 and 32. By virtue of the feedback path through the resistor 35 and capacitor 36, the voltage regulator oscillates between one state with the transistors 31 and 32 on and the transistor 27 off, and another state with the transistors 31 and 32 and the transistor 27 on. The mark-space ratio is determined by the current flowing through the Zener diode 25, which in turn is determined by the battery voltage. When the transistors 31 and 32 are on, energy is stored in the winding 30, and when the transistors 31 and 32 are turned off, current continues to circulate in the winding 30 by virtue of the freewheel path by way of the diode 34 and the contact 33, which is closed during normal operation of the system.

With an arrangement as described above, it is possible for components in the system to be damaged if the alternator output should rise as a result of a fault. By way of example, if the battery 16 becomes disconnected, then because the impedance presented to the alternator is substantially increased, the output voltage of the alternator rises. This rise in output voltage will quickly increase the current flowing through the Zener diode 25 to a stage where the transistor 27 is permanently on and the transistors 31 and 32 are permanently off. However, because the freewheel path through the diode 34 and the contact 33 has a low rate of dissipation, current continues to flow in the winding 30 for a period of time which may be sufficient to cause an over voltage surge of sufficient duration to damage equipment connected to the supply. In order to overcome this difficulty, the system is so arranged that the first freewheel path through the diode 34 and the contact 33 is broken when the output voltage of the alternator exceeds a predetermined value, which is substantially in excess of the normal regulated value, and a second freewheel path is connected across the winding 30, this second freewheel path having a substantial rate of dissipation so that in the event of a fault the output voltage of the alternator quickly falls. For this purpose, the Zener diode 39 is rated so that at normal output voltages on the line 18 the Zener diode 39 does not conduct. However, when a predetermined output voltage is reached, the Zener diode 39 conducts, and this itself of course tends to protect the regulator, because current can flow between the lines 18, 15 through the windings 38 and Zener diode 39. If this current is sufficiently high to energise the winding 38, then the contact 33 opens, breaking the freewheel path through the diode 34 and contact 33. However, a second freewheel path is now completed by way of the diode 34, the winding 38, the Zener diode 39 and the diode 37. As explained above, this second freewheel path has a substantial dissipation, and so the energy stored in the winding 30 is dissipated quickly, so that the alternator output falls to zero before any of the components in the system are damaged.

In the preferred arrangement, the first freewheel path is restored when the output of the alternator falls to an acceptable level, and in FIG. 1 this desideratum is achieved. Thus, when the output voltage of the alternator falls, a point will be reached at which the Zener diode 39 ceases to conduct, so that the contact 33 closes again.

The remaining drawings show modifications relating to the two freewheel paths. In these drawings, the line 18, and 15, the transistor 32 and the winding 30 are given the same reference numerals as in FIG. 1.

Figure 2:
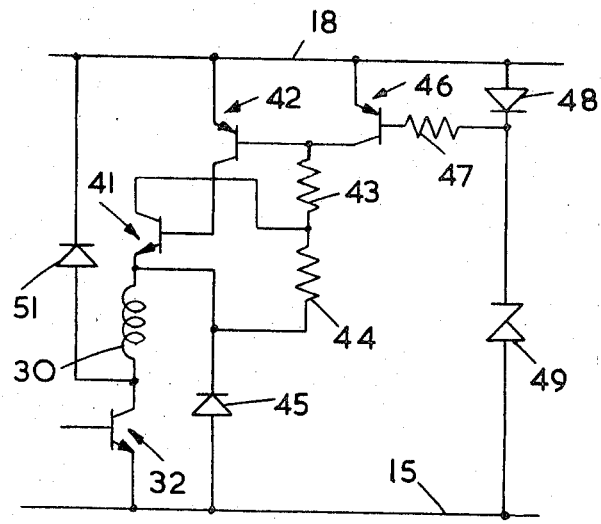

Referring to FIG. 2, the winding 30 has one end connected to the collector of the transistor 32 as in FIG. 1, and its other end connected to the emitter of an n-p-n transistor 41, the base of which is connected to the collector of a p-n-p transistor 42 with its emitter connected to the line 18. The base of the transistor 42 is connected through resistors 43, 44 in series to the emitter of the transistor 41, and the transistor 41 has its emitter connected through a diode 45 to the line 15 and its collector connected to the junction of the resistors 43, 44. The base of the transistor 42 is further connected to the collector of a p-n-p transistor 46 having its emitter connected to the line 18 and its base connected through a resistor 47 to the junction of a diode 48 and a Zener diode 49 connected in series between the lines 18, 15. The collector of the transistor 32 is connected to the line 18 through a diode 51.

In normal operation of the system, the Zener diode 49 does not conduct and so the transistor 46 is off. Whenever the transistor 32 is on, current flows through the emitter-base of the transistor 42, the resistors 43 and 44, the winding 30 and the transistor 32 so that the transistor 42 turns on to turn on the transistor 41. Thus, current flows through the winding 30 by way of the emitter-base of the transistor 41 and the collector-emitter of the transistor 42.

Energy is stored in the winding 30, and when the transistor 32 turns off this energy causes current to flow by way of the emitter-base of the transistor 41, the collector-emitter of the transistor 42 and the diode 51, so that this path constitutes the first freewheel path. Although the transistor 32 is off, the energy stored in the winding 30 holds the transistors 41 and 42 on.

In the event of a fault, the Zener diode 49 conducts and turns on the transistor 46. Conduction of the transistor 46 turns off the transistors 41 and 42, and the energy in the winding 30 is now dissipated through the second freewheel path, which includes the diode 51, the diode 48, the Zener diode 49 and the diode 45.

Figure 3:
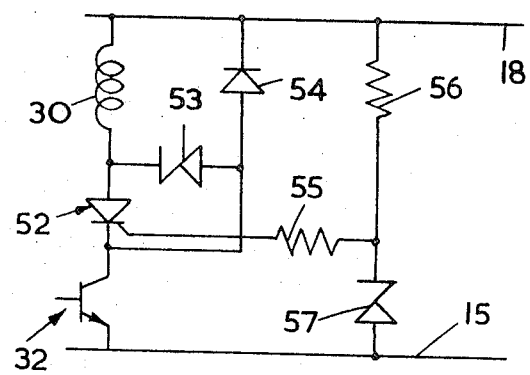

Turning now to FIG. 3, the winding 30 now has one end connected to the line 18, and its other end connected to the collector of the transistor 32 through the anode-cathode path of a gate controlled switch 52, which is a device having the properties of a thyristor, but the additional properties that it can be turned off by a negative gate-cathode pulse. The anode of the switch 52 is connected to the line 18 through a Zener diode 53 and a diode 54 in series, and the junction of the Zener diode 53 and diode 54 is connected to the collector of the transistor 32. The gate of the switch 52 is connected through a resistor 55 to the junction of a resistor 56 and a Zener diode 57 connected between the lines 18, 15.

When the transistor 32 is on, current flows through the resistors 56 and 55 to turn on the switch 52, so that current flows in the winding 30. When the transistor 32 turns off, the energy stored in the winding 30 maintains current flow through the switch 52, so that the first freewheel path is constituted by the anode-cathode path of the switch 52 and the diode 54. In the event of a fault, the Zener diode 57 conducts, and when the transistor 32 turns off, the potential across the resistor 56 is sufficient to turn off the gate controlled switch 52, breaking the first freewheel path. The energy stored in the winding 30 now turns on the Zener diode 53, and the second freewheel path is completed by way of the Zener diode 53 and the diode 54.

Figure 4:
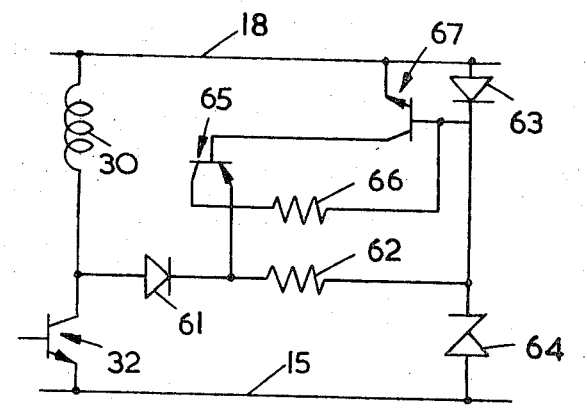

Referring now to FIG. 4, the winding 30 is connected between the collector of the transistor 32 and the line 18. The collector of the transistor 32 is further connected through a diode 61 and a resistor 62 in series to the junction of a diode 63 and a Zener diode 64 connected in series between the lines 18, 15. The junction of the diode 61 and resistor 62 is connected to the emitter of a p-n-p transistor 65 having its collector connected through a resistor 66 to the base of an n-p-n transistor 67, the emitter of which is connected to the line 18, the collector of which is connected to the base of the transistor 65, and the base of which is connected to the junction of the diode 63 and Zener diode 64.

In normal conditions, the Zener diode 64 is off. When the transistor 32 is on, energy is stored in the winding 30 and the transistors 65, 67 are off. When the transistor 32 turns off, current flows from the bottom of the winding 30 through the diode 61 and the resistor 62 and then by way of the base-emitter path of the transistor 67 to turn on the transistor 67, which turns on the transistor 65, which in turn provides additional base current to the transistor 67 by way of the resistor 66, so that the transistors 65, 67 effectively constitute a switch which turns on rapidly as soon as the transistor 32 turns off. However, in the event of a fault the Zener diode 64 conducts, and the resultant potential across the diode 63 holds off the transistor 67 so that the transistor 65 is also held off. Thus, when the transistor 32 turns off, the first freewheel path through the diode 61 and the transistors 65, 67 is broken, but a second freewheel path of substantial dissipation is provided by way of the diode 61, the resistor 62, the Zener diode 64, and the diodes 13, 17 in the rectifier.

Figure 5:
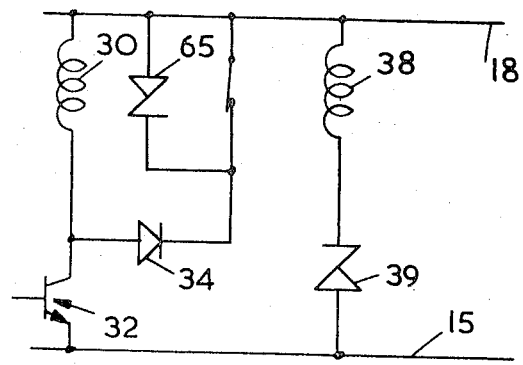

In FIG. 5, the arrangement is similar to FIG. 1, and the same reference numerals have been employed. As compared with FIG. 1, the winding 30 has its upper end connected directly to the line 18, and the contact 33 is now positioned between the cathode of the diode 34 on the line 18, and is bridged by a Zener diode 65. The diode 37 is omitted. When the Zener diode 39 does not conduct, the contact 33 is closed and the first freewheel path is provided by way of the diode 34 and contact 33. When the Zener diode 39 conducts and the winding 38 is energised, the contact 33 opens and the second freewheel path is provided through the diode 34 and Zener diode 65.

It will be appreciated that in FIG. 1, the first freewheel path is restored as soon as the Zener diode 39 turns off, that is to say when the voltage on the line 18 falls to a value which is not the normal value, but is below the danger level at which the Zener diode 39 is chosen to conduct. Depending on the application, it may be desirable for the first freewheel path not to be restored until the voltage falls to normal, and the arrangement of FIG. 3 accomplishes this, because not only must the Zener diode 57 cease to conduct, but the transistor 32 must turn on again to turn on the switch 52. The transistor 32 will only of course turn on again when the normal voltage is restored and the regulator commences to operate with its normal switching action. If desired, FIG. 4 can be made to operate in this way by using a capacitor in place of the resistor 62.

In all the arrangements described, further surgelimiting circuits can be connected between the lines 18, 15, and/or across the field winding 30.

I claim:

1. A battery charging system comprising a wound field alternator for charging the battery, a voltage regulator for controlling the output of the alternator by varying the current flow in the field winding of the alternator, a first freewheel path connected across said field winding and permitting continued flow of current in said field winding when the supply to the field winding is interrupted, a second freewheel path across said field winding and having a substantially higher rate of dissipation than the first freewheel path, and means operable when the output voltage of the alternator exceeds a predetermined value in excess of the regulated value for disconnecting the first freewheel path whereby current flows through the second freewheel path.

2. A system as claimed in claim 1 in which the second freewheel path is connected across the field winding permanently, and is normally short-circuited by the first freewheel path.

3. A system as claimed in claim 1 in which the second freewheel path is connected across the field winding only when the first freewheel path is disconnected.

4. A system as claimed in claim 1 in which the first and second freewheel paths employ a common diode.

5. A system as claimed in claim 1 in which the first freewheel path is restored when the output voltage of the alternator falls to said predetermined value.

6. A system as claimed in claim 1 in which the first freewheel path is restored when the output voltage of the alternator falls to the normal regulated value.

7. A system as claimed in claim 1 including a normally closed relay contact in series with said field winding, a diode connected across the series combination of relay contact and field winding, the diode and relay contact constituting the first freewheel path, and a relay winding and Zener diode connected in series across the alternator output, the Zener diode conducting at said predetermined value to energise the winding and open the contact.

8. A system as claimed in claim 7 including positive and negative d.c. supply lines powered by the alternator and between which the relay winding and Zener diode are connected, the first mentioned diode coupling one end of the field winding to the positive line, and the second freewheel path comprising the first diode, the relay winding and Zener diode, and a further diode coupling the other end of the field winding to the negative line.

9. A system as claimed in claim 1 including first and second d.c. supply lines powered by the alternator, one end of the field winding being connected to the second line through a switching device forming part of the regulator, and said first freewheel path comprising a diode connected said one end of the field winding to the first line, and a transistor circuit connecting the other end of the field winding to the first line, the transistor circuit being turned on by current flow through the switching device and field winding when the switching device is on, and held on, by energy stored in the field winding, when the switching device is off, said means for disconnecting the first freewheel path serving to turn off the transistor circuit.

10. A system as claimed in claim 9 in which said means comprises a diode and a Zener diode connected in series between the supply lines with the junction of the diode and Zener diode coupled to the transistor circuit, the Zener diode conducting at said predetermined value.

11. A system as claimed in claim 10 in which the second freewheel path comprises the series circuit of diode and Zener diode, the first-mentioned diode, and a third diode coupling said other end of the field winding to the second line.

12. A system as claimed in claim 1 including positive and negative supply lines powered by the alternator, one end of the field winding being connected to the positive line and the other end of the field winding being connected to the negative line through the anode-cathode path of a gate controlled switch and a switching device in series, the switching device forming part of the voltage regulator, the gate controlled switching being held on when the alternator output is below the predetermined value and turned off when the alternator output is above the predetermined value, and said first freewheel path comprising the anode-cathode path of the gate controlled switch and a diode coupling the cathode of the gate controlled switch to the positive line.

13. A system as claimed in claim 12 including a resistor and a Zener diode connected in series between the positive and negative lines, the junction of the resistor and Zener diode being coupled through a second resistor to the gate of the gate controlled switch, the Zener diode conducting at said predetermined alternator output to turn off the gate controlled switch.

14. A system as claimed in claim 12 in which the second freewheel path comprises a Zener diode connected between the anode and cathode of the gate controlled switch, and said diode, the Zener diode being turned on by energy stored in the field winding when the gate controlled switch is turned off.

15. A system as claimed in claim 1 including first and second supply lines which are powered by the alternator through a full wave rectifier, one end of the field winding being connected to the first supply line, and the other end of the field winding being connected to the second supply line through a switching device forming part of the voltage regulator, the first freewheel path comprising a diode and a switching circuit connected between said other end of the field winding and said first supply line, said switching circuit being non-conductive when the switching device is on, but being turned on by energy stored in the field winding when the switching device is off, and the means operable when the output of the alternator exceeds a predetermined value serving to hold said switching circuit off when the switching device turns off.

16. A system as claimed in claim 15 including a second diode and a Zener diode connected in series between the supply lines, the Zener diode conducting at the predetermined alternator output and the junction of the second diode and Zener diode being connected to the switching circuit to hold the switching circuit off when the Zener diode conducts.

17. A system as claimed in claim 16 including a resistor coupling the first-mentioned diode to the junction of the second diode and Zener diode, the second freewheel path being constituted by the first diode, the resistor, the Zener diode and part of the full wave rectifier coupling the alternator to the supply lines.

18. A system as claimed in claim 17 in which the resistor is replaced by a capacitor.

19. A system as claimed in claim 1 in which the first freewheel path is constituted by a diode and a normally closed relay contact connected in series across the field winding, a relay winding and Zener diode being connected in series across the alternator output, the Zener diode conducting at said predetermined value and energising the relay winding to open the relay contact and so break the first freewheel path.

20. A system as claimed in claim 19 in which the second freewheel path comprises said diode and a second Zener diode connected across the relay contact.

* * * * *